(12) United States Patent
Arisawa

(10) Patent No.: US 6,626,363 B2
(45) Date of Patent: *Sep. 30, 2003

(54) ANTENNA DEVICE AND CARD-SHAPED STORAGE MEDIUM

(75) Inventor: Shigeru Arisawa, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/448,081

(22) Filed: Nov. 23, 1999

(65) Prior Publication Data

US 2002/0096568 A1 Jul. 25, 2002

(30) Foreign Application Priority Data

Nov. 30, 1998 (JP) ............................. P10-356981

(51) Int. Cl.$^7$ ..................... G06K 19/06; G06K 7/00
(52) U.S. Cl. ............................ 235/492; 235/439
(58) Field of Search ................. 235/492, 379, 235/382.5, 383, 384, 385, 439; 343/861, 745, 750, 748

(56) References Cited

U.S. PATENT DOCUMENTS

| | | | |
|---|---|---|---|
| 5,652,423 A | * 7/1997 | Saitoh et al. | 235/492 |
| 5,698,838 A | * 12/1997 | Yamaguchi | 235/492 |
| 5,801,372 A | * 9/1998 | Yamaguchi | 235/492 |
| 6,126,077 A | * 10/2000 | Tanaka et al. | 235/492 |
| 6,161,762 A | * 12/2000 | Bashan et al. | 235/492 |
| 6,396,821 B1 | * 5/2002 | Takahashi | 370/335 |

FOREIGN PATENT DOCUMENTS

| | | | |
|---|---|---|---|
| DE | 19542900 A1 | 5/1997 | G06K/19/07 |
| DE | 19646209 A1 | 5/1997 | G06K/19/077 |
| WO | WO 96/08054 | 3/1996 | H01Q/7/00 |
| WO | WO 97/34247 | 9/1997 | |

* cited by examiner

Primary Examiner—Karl D. Frech
Assistant Examiner—April Nowlin
(74) Attorney, Agent, or Firm—Bell, Boyd & Lloyd LLC

(57) ABSTRACT

An antenna device can operate a connected electronic circuit always efficiently and normally. The antenna device for supplying a predetermined electronic circuit with electromotive force based on the energy of electromagnetic waves received via the antenna comprises a load resistance conversion means for converting the load resistance of the electronic circuit from the viewpoint of the antenna into a predetermined value, and the load resistance conversion means supplies the electronic circuit with the maximum electromotive force.

14 Claims, 8 Drawing Sheets

ANTENNA DEVICE AND CARD-SHAPED STORAGE MEDIUM

BACKGROUND OF THE INVENTION

1. Field of the Invention

This invention relates to an antenna device and a card-shaped storage medium, and more particularly, is suitably applicable to an antenna device and a card-shaped storage medium to write and read out data in non-contact with an integrated circuit (IC) card.

2. Description of the Related Art

IC card systems have been experimentally introduced in fields of ticket checking machines of stations, security systems, and electronic money systems, etc. comprising a data reader/writer and IC cards, which can write/read data to/from IC cards without contact.

Data reader/writer modulates carrier waves based on data to be transmitted, and emits the modulated electromagnetic waves (for example, fluctuating magnetic fields) to an IC card. After receiving the emitted electromagnetic waves, the IC card obtains demodulated data by performing demodulation in a demodulating method corresponding to the modulation method performed by the data reader/writer and processes the data through a predetermined electronic circuit. And the IC card reads out response data from its internal memory based on the data processed through the electronic circuit, modulates the carrier waves based on the read-out response data, and emits the modulated electromagnetic waves toward the data reader/writer.

In such an IC card system, a dipole antenna is provided inside an IC card to receive magnetic energy of electromagnetic waves emitted from a data reader/writer, but it is physically difficult and unrealistic that a dipole antenna is installed inside the IC card. This is because the size of the card itself is extremely small compared with the wavelength of electromagnetic waves.

Because of the circumstances, a loop antenna is installed in an IC card itself to receive electromagnetic waves. In such an IC card with a loop antenna, an electronic circuit is generally made to operate based on the magnetic energy of the electromagnetic waves emitted and received since an internally-installed battery to supply power could hamper miniaturization and weight reduction as well as maintenance-readiness, and in such cases, a loop antenna especially superior in reception efficiency will be indispensable.

As shown in FIG. 1, in the IC card 1 a capacitor 3 is connected with a loop antenna 2 in parallel, and an electronic circuit 4 operates by using electromotive force to be obtained at the both ends of the said capacitor 3.

In this case, the loop antenna 2 converts the change of interlinkage magnetic flux into a voltage under the principle of electromagnetic induction, and supplies this voltage to the electronic circuit 4, and increasing in the area where interlinkage magnetic flux passes can improve reception efficiency in the IC card 1.

In addition, in the IC card 1, a resonant capacitor 3 is connected with the loop antenna 2 in parallel to configure a resonant circuit, so that the reception efficiency may be improved by tuning the circuit to the received electromagnetic waves.

Incidentally, in the IC card 1 having such a configuration, as shown in FIG. 2, the loop antenna 2 and the resonant capacitor 3 efficiently receive electromagnetic waves emitted from a loop antenna 6 of a data reader/writer 5 disposed opposite at a predetermined distance and supplies the received power according to the energy of the said electromagnetic waves to a load resistance $R_{cir}$ equivalent to the electronic circuit 4.

This IC card 1 is provided with a rectifier circuit 9 composed of a diode 7 and a capacitor 8 at the prestage of the load resistance $R_{cir}$. This converts the received power to be supplied to the load resistance $R_{cir}$ into an easily measurable direct voltage so as to get an accurate measurement.

In this case, the IC card 1 can provide the maximum voltage when the load resistance $R_{cir}$ is infinitely large, but the current flow is so little that the reception power to be supplied to the electric circuit 4 is very small. Conversely, when the load resistance $R_{cir}$ is very small, much current flows there, but since little voltage is available, the reception power to be supplied to the electronic circuit 4 is very small. Therefore, in the IC card 1, there is an optimum value of the load resistance $R_{cir}$ to supply the maximum reception power to the electronic circuit 4.

FIG. 3 shows measurement results of the reception power in the IC card 1, where there is an optimum value of the load resistance $R_{cir}$ for each distance between the data reader/writer 5 and the IC card 1 (for example, 6 cm, 8 cm, 10 cm and 12 cm) when the maximum value of the reception power P is obtainable from the IC card 1.

That is, the optimum value $R_{pow}$ of the load resistance $R_{cir}$ from which the maximum reception power P can be obtained is, for example, approximately 5 kΩ for the distance of 6 cm, approximately 7 kΩ for the distance of 8 cm, approximately 9 kΩ for the distance of 10 cm, and approximately 10 kΩ for the distance of 12 cm.

However, in the IC card 1, the load resistance $R_{cir}$ in the connected electronic circuit 4 and the optimum value $R_{pow}$ from which the maximum reception power P can be obtained are not always correspondent. Therefore there still remained such a problem that sufficient reception power can not be obtained and the circuit inside the card did not work normally even if a transmission distance enough to work properly might be given.

In addition, in such a case, the IC card 1 requires an excessive power supply by strong electromagnetic waves from the data reader/writer 5 to keep the circuits operating accurately. This has caused a problem that the power consumption of the data reader/writer 5 is increased.

SUMMARY OF THE INVENTION

In view of the foregoing, an object of this invention is to provide an antenna device and a card-shaped storage medium which enables the electric circuit to be connected to always operate efficiently and normally.

The foregoing object and other objects of the invention have been achieved by the provision of an antenna device for supplying a predetermined electronic circuit with electromotive force based on the energy of electromagnetic waves received via the antenna. The antenna device comprises a load resistance conversion means for converting the load resistance of the electronic circuit from the viewpoint of the antenna itself into a predetermined value so as to supply the maximum electromotive force to the electronic circuit with this load resistance conversion means. Thus the electronic circuit connected can always operate efficiently and normally.

Further, the invention provides a card-shaped storage medium for writing/reading data to/from a predetermined electronic circuit via electromagnetic waves in non-contact. The card-shaped storage medium comprises an antenna for receiving electromagnetic waves and supplying a predetermined electronic circuit with electromotive force based on the energy of the electromagnetic waves, and a load resistance conversion means for converting the load resistance of the electronic circuit from the viewpoint of the antenna to a predetermined value, and supplies the maximum electromotive force to the electronic circuit with the load resistance conversion means. Therefore the electronic circuit can always operate efficiently and normally. This reduces the size of the antenna itself and can realize a small tag-type of storage medium of several centimeters square or even several millimeters square, which is much smaller than a normal credit card.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Overall Configuration of an IC Card System

Figure 4:
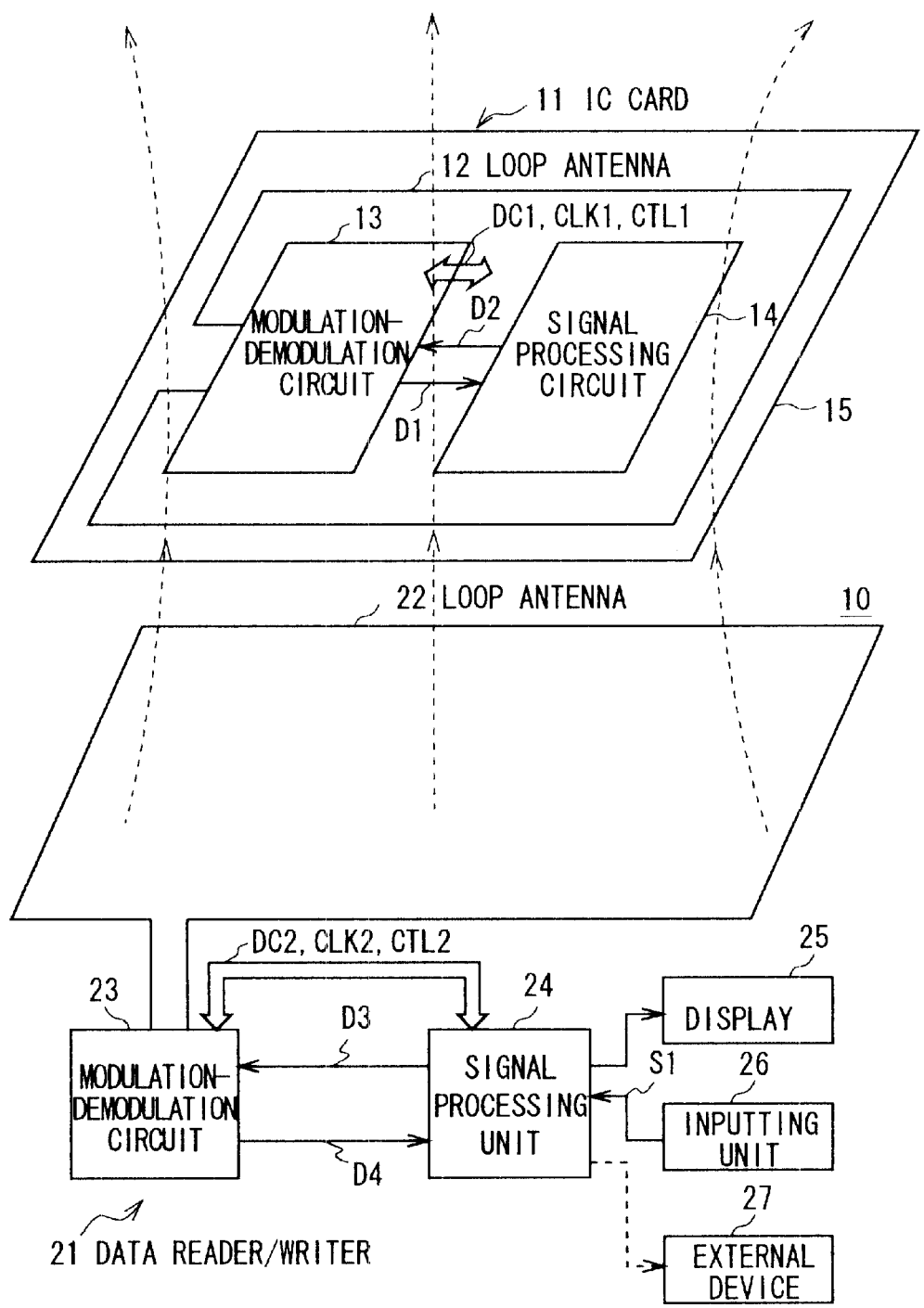
FIG. 4 is a block diagram showing a configuration of a non-contact IC card system.

In FIG. 4, 10 shows a non-contact integrated circuit (IC) card system as a whole, comprising an IC card 11 and a data reader/writer 21.

The IC card 11 is a battery-less type of IC card which is not equipped with a battery for power supply, and is mounted, for example, on a substrate 15 which is plane like a credit card. The IC card includes a coil-shaped loop antenna 12 to receive electromagnetic waves emitted from the data reader/writer 21 to convert them into electric signals, a modulation-demodulation circuit 13 for modulating transmission data or demodulating received data, and a signal processing circuit 14 to analyzing received data and generate transmission data.

Actually, in the IC card 11, the electromagnetic waves emitted form the data reader/writer 21 are received by the loop antenna 12, and are transmitted to the modulation-demodulation circuit 13 as modulated waves. The modulation-demodulation circuit 13 demodulates the modulated waves, which are then transmitted to the signal processing circuit 14 as regenerated data D1 transmitted from the data reader/writer 21.

The signal processing circuit 14 comprises a central processing unit (CPU), having a read only memory (ROM) and a random access memory (RAM) inside (not shown), to read out programs stored in the ROM so as to analyze the regenerated data D1 with the RAM, and to read out response data D2 stored in an internal nonvolatile memory (not shown) based on the regenerated D1, and transmit this to the modulation-demodulation circuit 13. The modulation-demodulation circuit 13 modulates it based on the response data D2 and emits it from the loop antenna 12 to the data reader/writer 21 as electromagnetic waves.

Here, the modulation-demodulation circuit 13 has a power source circuit (not shown) to convert the energy of electromagnetic waves into a stable direct power source, and based on the electromagnetic waves emitted from the data reader/writer 21 and received by the loop antenna 12, generates a direct power source DC1 with the power source circuit and supplies this to the signal processing circuit 14, and emits to the signal processing circuit 14 the clock signal CLK1 generated based on the received electromagnetic waves, and receives control signals CTL1 for various kinds of control from the signal processing circuit 14.

The data reader/writer 21 transmits to the signal processing unit 24 the instruction signals S1 from the input unit 26 comprising a keyboard and a console panel, etc. The signal processing unit 24 comprises a CPU, having a ROM and a RAM internally (not shown), and read out the programs stored in the ROM, and performs signal processing with the RAM in accordance with the instruction signals S1 so as to generate transmission data D3 to be transmitted to the IC card 11, and transmits this to the modulation-demodulation circuit 23.

Using such carrier waves within a predetermined frequency band as to be efficiently emitted as electromagnetic waves, the modulation-demodulation circuit 23 performs modulation processing based on the transmission data D3 which is then emitted from the loop antenna 22 as electromagnetic waves.

In addition, the data reader/writer 21 receives with the loop antenna 22 the electromagnetic waves emitted from the IC card 11 and transmits this to the modulation-demodulation circuit 23 as the modulated waves. The modulation-demodulation circuit 23 demodulates the modulated waves, and transmits them to the signal processing unit 24 as regenerated data D4 transmitted from the IC card 11.

Here, the signal processing unit 24 is to supply the direct power source DC2 supplied from outside to the modulation-demodulation circuit 23, and is to transmit clock signals CLK2 and control signals CTL2 for various kinds of control to the modulation-demodulation circuit 23.

The signal processing unit 24 performs signal processing based on the received regenerated date D4, and displays the result on a display 25. In addition, the signal processing unit 24 is further to be capable of transmitting the signal processing result based on the regenerated D4 to an external device 27.

(2) IC Cards Comprising Load Resistance Converter

Next, an IC card 11 will be described, which comprises a load resistance converter to receive with the loop antenna 12 electromagnetic waves emitted from the data reader/writer 21 and to supply the maximum reception power.

Figure 5:
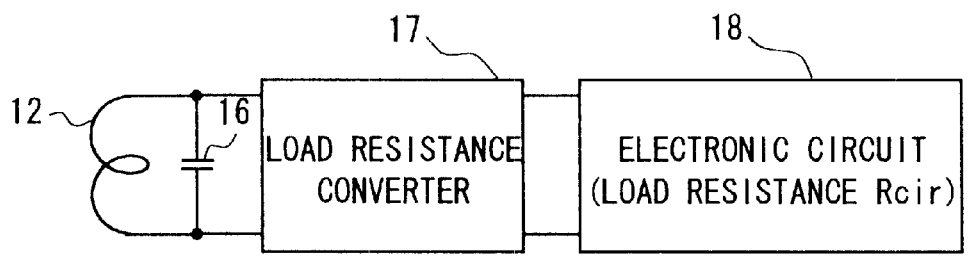
FIG. 5 is a connection diagram showing a configuration of an IC card of the present invention.

As shown in FIG. 5, in the IC card 11, a resonant capacitor 16 is connected with a loop antenna 12 in parallel to configure a resonant circuit, thereby reception efficiency can be improved by tuning the circuit to the received electromagnetic waves.

In addition, in the IC card 11, a load resistance converter 17 is disposed at the prestage of the electronic circuit 18 including the modulation-demodulation circuit 13 and the signal processing circuit 14 (see FIG. 4), so that the load resistance $R_{cir}$ of the electronic circuit 18 is converted so as to obtain the maximum reception power from the both ends of the resonant capacitor 16.

(2-1) Configuration of the Load Resistance Converter using a Transformer

Figure 6:
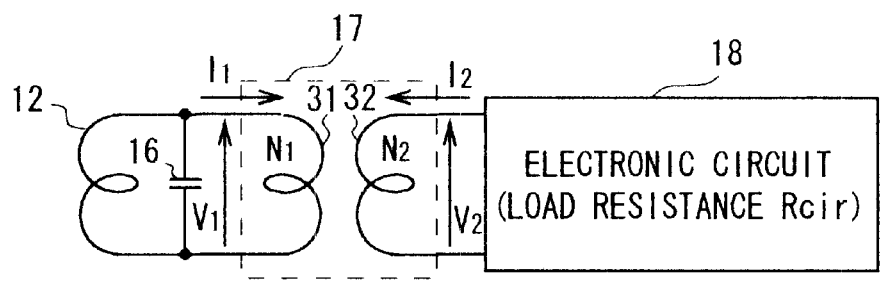
FIG. 6 is a connection diagram showing a configuration of the load resistance converter using a transformer.

As shown in FIG. 6, where the portions correspondent with those in FIG. 5 are numbered same, a load resistance converter 17 is composed of a transformer consisting of a primary coil 31 with the winding number $N_1$ and a secondary coil 32 with the winding number $N_2$. Assuming that the applied voltage to the primary coil 31 is $V_1$, the applied voltage to the secondary coil 32 is $V_2$, the flow-in current to the primary coil 31 is $I_1$, the flow-in current to the secondary coil 32 is $I_2$, and the load resistance of the electronic circuit 18 is $R_{cir}$, the relation between the winding number and the applied voltage is expressed by the following equation from the viewpoint of the transformer's characteristics.

$$V_1 = V_2 \cdot \frac{N_1}{N_2} \quad (1)$$

In addition, the relationship among the load resistance $R_{cir}$, the applied voltage $V_2$ to the secondary coil 32, and the flow-in current $I_2$ to the secondary coil 32 is expressed by the following equation.

$$V_2 = I_2 \cdot R_{cir} \quad (2)$$

Moreover, suppose that there is no energy loss in the transformer, powers in the primary coil 31 and the secondary coil 32 are the same, so the relationship among the applied voltage $V_1$ to the primary coil 31, the applied voltage $V_2$ to the secondary coil 32, the flow-in current $I_1$ to the primary coil 31 and the flow-in current $I_2$ to the secondary coil 32 is obtained by the following equation.

$$V_1 \cdot I_1 = V_2 \cdot I_2 \quad (3)$$

Accordingly, the ratio $(V_1/I_1)$ between the applied voltage $V_1$ and the flow-in current $I_1$ in the primary coil 31 of the load resistance converter 17 comprising a transformer is expressed by the following equation.

$$\frac{V_1}{I_1} = \left[\frac{N_1}{N_2}\right]^2 \cdot R_{cir} \quad (4)$$

This equation indicates that the load resistance $R_{cir}$ has been converted and multiplied by $(N_1/N_2)^2$, from the viewpoint of the primary coil 31.

Here, in the load resistance converter 17, when the equation 4 is transformed by setting the ratio $(V_1/I_1)$ $R_{pow}$ as the optimum value of the load resistance from which the maximum reception power can be obtained, the winding ratio $(N_1/N_2)$ between the winding number $N_1$ and the winding number $N_2$ is expressed by the following equation.

$$\frac{N_1}{N_2} = \left[\frac{R_{pow}}{R_{cir}}\right]^{1/2} \quad (5)$$

Figure 1:
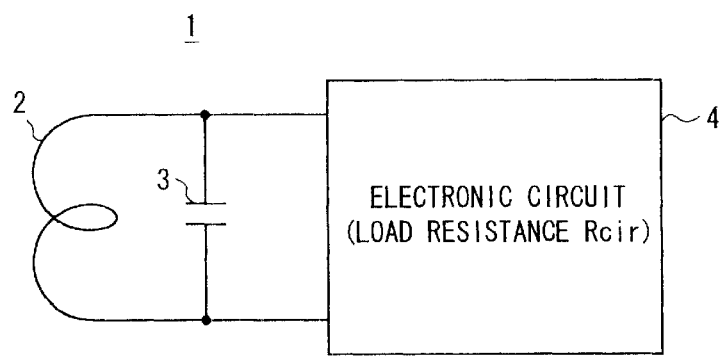
FIG. 1 is a schematic diagram explaining a method of connection between a resonant-type loop antenna and an electronic circuit in a conventional IC card.
Figure 2:
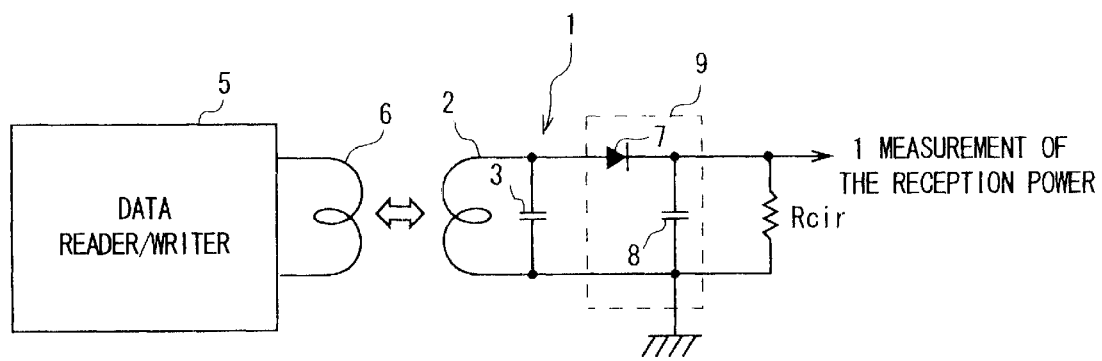
FIG. 2 is a schematic diagram showing a method of measurement of reception power.
Figure 3:
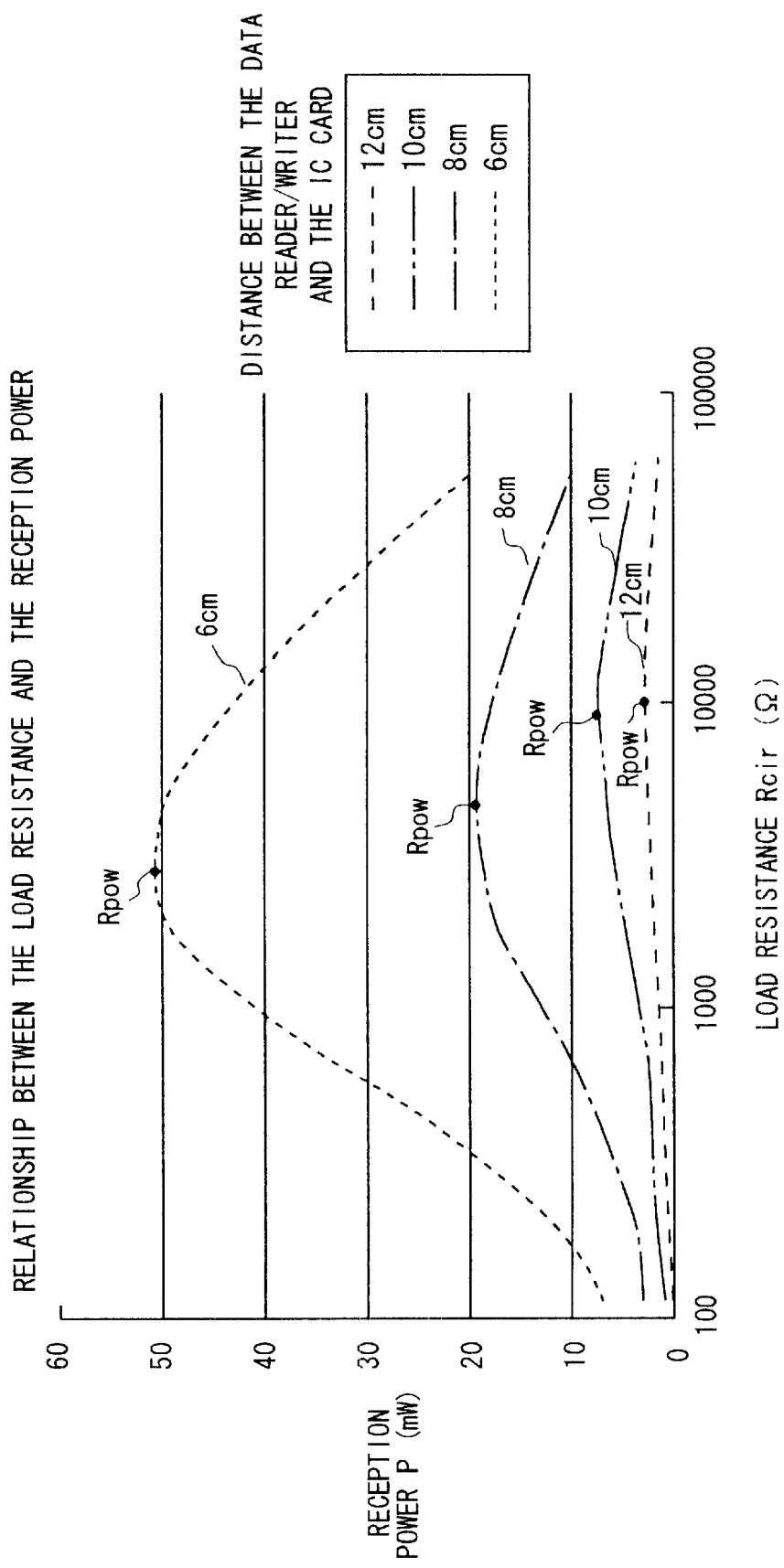
FIG. 3 is a graph showing curves characterizing the relationship between power received by the resonant-type loop antenna and a load resistance.

That is, in the load resistance converter 17 using the transformer, if the load resistance $R_{cir}$ of the electronic circuit 18 itself and the optimum value $R_{pow}$ (see FIG. 3) of the load resistance from which the maximum reception power can be obtained are determined, the winding ratio $(N_1/N_2)$ is determined. Accordingly, in the IC card 11, the load resistance converter 17 is provided at the prestage of the electronic circuit 18 so that the maximum reception power can be supplied to the electronic circuit 18, in which the load resistance converter 17 comprises the primary coil 31 and the secondary coil 32 which have the winding ratio $(N_1/N_2)$ determined in accordance with the load resistance $R_{cir}$ of the electronic circuit 18 and the optimum value $R_{pow}$ of the load resistance from which the maximum reception power can be obtained.

Figure 7:
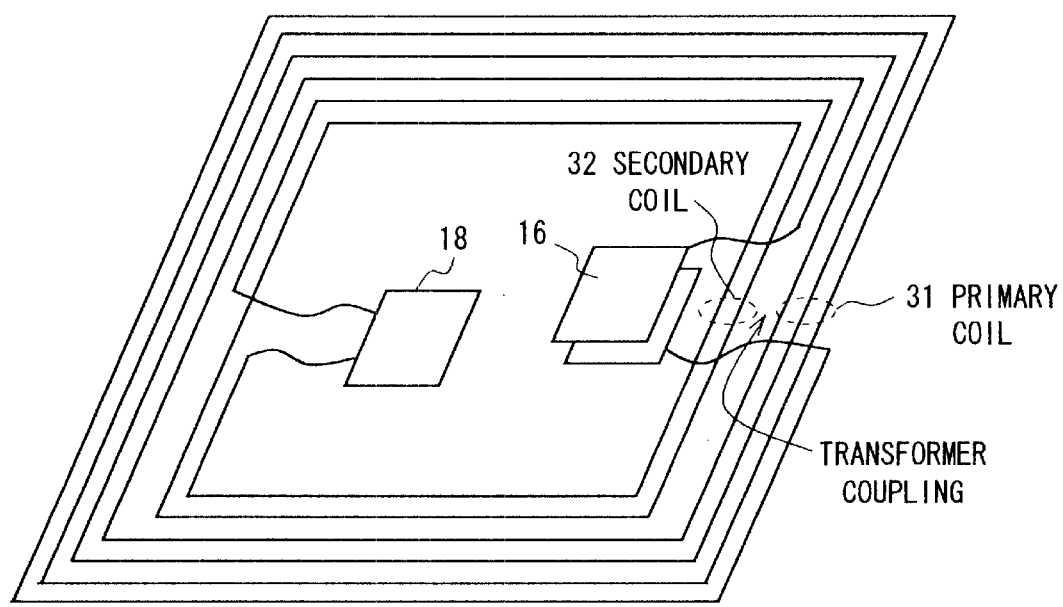
FIG. 7 is a schematic diagram showing an image of the load resistance converter using a transformer.

In such a load resistance converter 17 using the transformer, the primary coil 31 with the winding number $N_1$ having been connected with the resonant capacitor 16 is mounted on the substrate 15 as shown in FIG. 7, and the secondary coil 32 with the winding number $N_2$ having been connected with the electronic circuit 18 is mounted at a position at a predetermined distance from the primary coil 31. The converter 17 converts the load resistance $R_{cir}$ of the electronic circuit 18 into the optimum value $R_{pow}$ from which the maximum reception power can be obtained, by using transformer coupling between the primary coil 31 and the secondary coil 32.

Thus, the IC card 11 can supply the maximum reception power to the electronic circuit 18 efficiently as a result of providing the load resistance converter 17 using a transformer with a predetermined winding ratio at the prestage of the electronic circuit 18 to supply the maximum reception power. Thereby, the IC card 11 can perform stable data communication with the data reader/writer 21 from a long distance.

(2-2) Configuration of the Load Resistance Converter Using an Intermediate Tap

Figure 8:
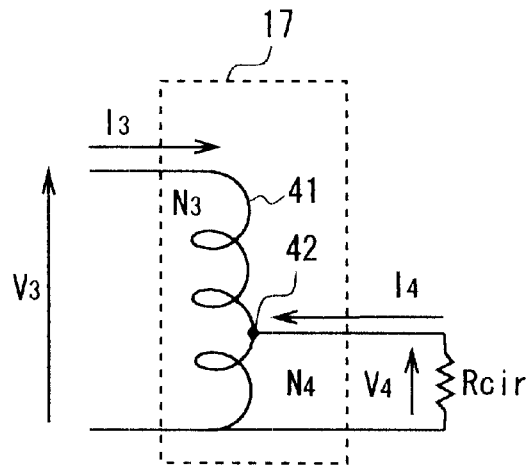
FIG. 8 is a connection diagram showing a configuration of the load resistance converter using an intermediate tap.

As shown in FIG. 8, where the portions correspondent with those in FIG. 5 are numbered same, the load resistance converter 17 has a loop coil 41 with the winding number $N_3$, and supplies the power obtained by the intermediate tap 42 of the said loop coil 41 to the load resistance $R_{cir}$.

In this case, in the load resistance converter 17 using the intermediate tap, assuming that the winding number of the loop coil 41 is $N_3$, the winding number of the intermediate tap is $N_4$, the applied voltage of the loop coil 41 is $V_3$, the applied voltage of the intermediate tap 42 is $V_4$, the flow-in current to the loop coil 41 is $I_3$, and the flow-in current to the intermediate tap 42 is $I_4$, the relationship between the winding number and the applied voltage is expressed by the following equation.

$$V_3 = V_4 \cdot \frac{N_3}{N_4} \quad (6)$$

In addition, the relationship among the load resistance $R_{cir}$, the applied voltage $V_4$ of the intermediate tap 42, and the flow-in current $I_4$ into the intermediate tap 42 is expressed by the following equation.

$$V_4 = I_4 \cdot R_{cir} \quad (7)$$

Moreover, suppose that there is no energy loss in the loop coil 41 and in the intermediate tap 42, the power given to the loop coil 41 and the power given to the intermediate tap 42 are the same, so the relationship among the applied voltage $V_3$ of the loop coil 41, the applied voltage $V_4$ of the intermediate tap 42, the flow-in current $I_3$ to the loop coil 41 and the flow-in current $I_4$ to the intermediate tap 42 is expressed by the following equation.

$$V_3 \cdot I_3 = V_4 \cdot I_4 \quad (8)$$

Accordingly, the ratio $(V_3/I_3)$ between the applied voltage $V_3$ and the flow-in current $I_3$ in the loop coil 41 of the load resistance converter 17 using an intermediate tap 42 is expressed by the following equation.

$$\frac{V_3}{I_3} = \left[\frac{N_3}{N_4}\right]^2 \cdot R_{cir} \quad (9)$$

This indicates that the load resistance $R_{cir}$ has been converted and multiplied by $(N_3/N_4)^2$ from the viewpoint of the loop coil 41.

Here, in the load resistance converter 17, when the equation 9 is transformed by setting the ratio $(V_3/I_3)$ as the optimum value $R_{pow}$ of the load resistance from which the maximum received power can be obtained, the winding ratio $(N_3/N_4)$ between the winding number $N_3$ and the winding number $N_4$ is expressed by the following equation.

$$\frac{N_3}{N_4} = \left[\frac{R_{pow}}{R_{cir}}\right]^{1/2} \quad (10)$$

That is, in the load resistance converter 17 using the intermediate tap, when the load resistance $R_{cir}$ and the optimum value $R_{pow}$ (see FIG. 3) of the load resistance from which the maximum reception power can be obtained are both determined, the winding ratio $(N_3/N_4)$ is determined. Accordingly, in the IC card 11, the load resistance converter 17 is provided at the prestage of the load resistance $R_{cir}$, so that the maximum reception power can be supplied to the electronic circuit 18 (the load resistance $R_{cir}$), in which the load resistance converter 17 comprises the loop coil 41 and the intermediate tap 42 which have the winding ratio $(N_3/N_4)$.

Figure 9A:
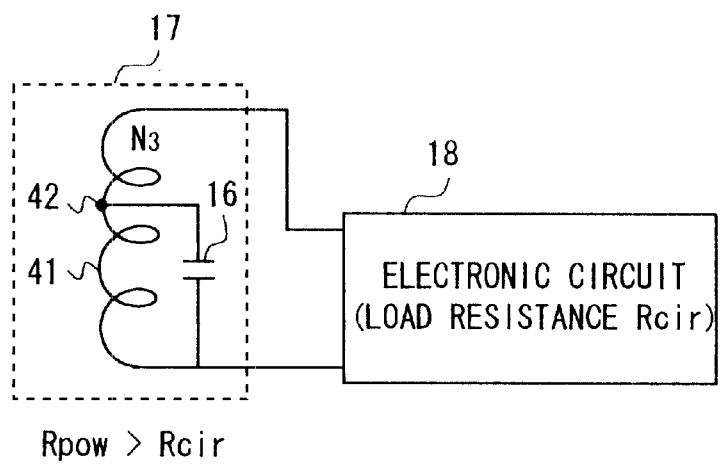
FIGS. 9A and 9B are connection diagrams exemplifying a connection between the load resistance converter using the intermediate tap and the electronic circuit.
Figure 9B:
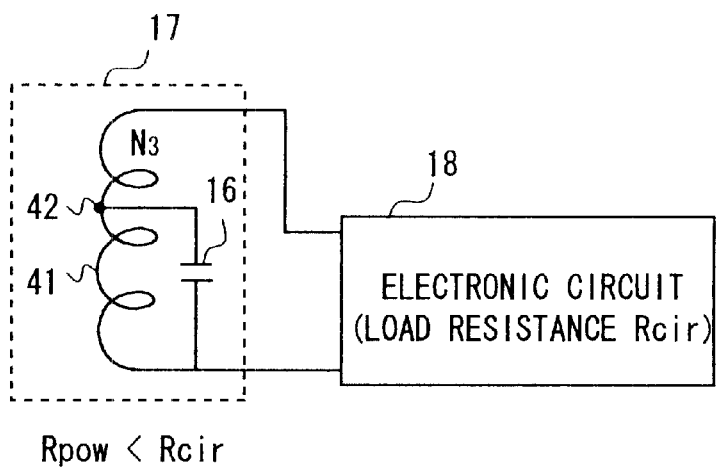

For example, the load resistance converter 17 using an intermediate tap shown in FIG. 9A exemplifies a case where the optimum value $R_{pow}$ from which the maximum reception power can be obtained is more than the load resistance $R_{cir}$ of the electronic circuit 18. And the load resistance converter 17 using an intermediate tap shown in FIG. 9B exemplifies a case where the optimum value $R_{pow}$ from which the maximum reception power can be obtained is less than the load resistance $R_{cir}$ of the electronic circuit 18.

Figure 10:
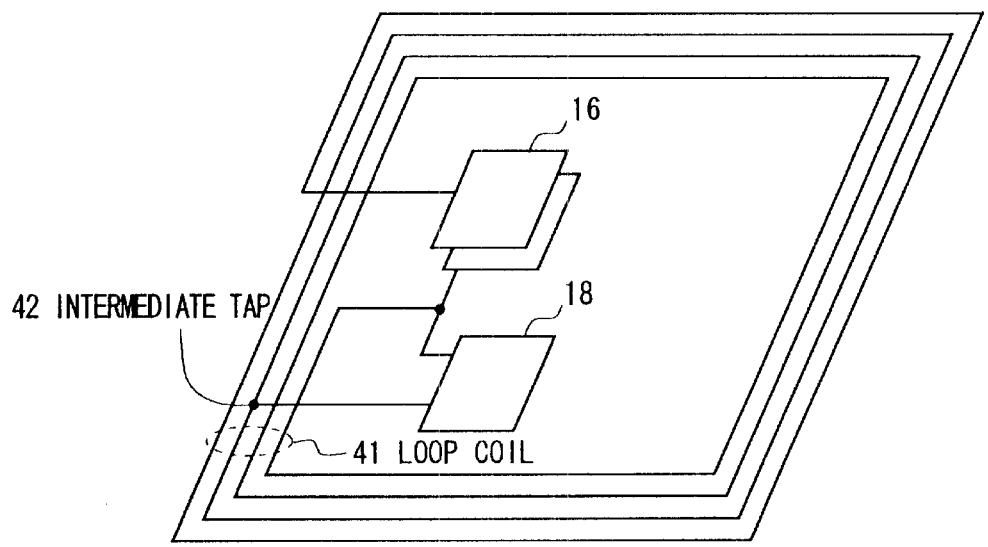
FIG. 10 is a schematic diagram showing an image of the load resistance converter using an intermediate tap.

Such a load resistance converter 17 using an intermediate tap converts the load resistance $R_{cir}$ of the electronic circuit 18 into the optimum value $R_{pow}$ from which the maximum reception power can be obtained $(R_{pow} > R_{cir})$ by mounting the loop coil 41 with the winding number $N_3$ connected with the resonant capacitor 16 on the substrate 15 and connecting the electronic circuit 18 with one end of the loop coil 41 and the intermediate tap 42 with the winding number $N_4$, as shown in FIG. 10.

Thus, the IC card 11, in which the load resistance converter 17 using the intermediate tap 42 is provided at the prestage of the electronic circuit 18, can efficiently supply the electronic circuit 18 with the maximum reception power. As a result, the IC card 11 can perform a stable data communication with the data reader/writer 21 from a long distance.

Figure 11:
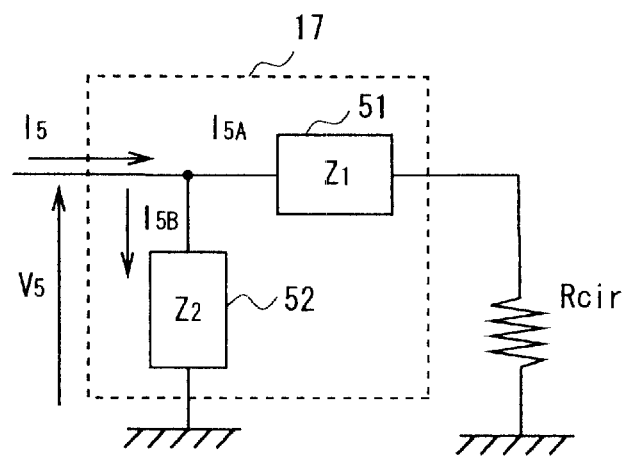
FIG. 11 is a connection diagram showing a configuration of the load resistance converter using inductance and capacitance.

(2-3) Configuration of a Load Resistance Converter Using Inductance and Capacitance As shown in FIG. 11, where the portions correspondent with those in FIG. 5 are numbered same, the load resistance converter 17 is configured by comprising reactance elements 51 and 52 either one of which is treated as an inductance and the other is treated as a capacitance and which are respectively connected with the load resistance $R_{cir}$ in parallel and in series.

In this load resistance converter 17, assuming that the applied voltage is $V_5$, the flow-in current is $I_5$, the flow-in current into the reactance element 51 is $I_{5A}$, the flow-in current into the reactance element 52 is $I_{5B}$, the reactance of the reactance element 51 is $Z_1$, and the reactance of the reactance element 52 is $Z_2$, the flow-in currents $I_{5A}$ and $I_{5B}$ are respectively expressed by the following equations.

$$I_{5A} = \frac{V_5}{R_{cir} + Z_1} \quad (11)$$

$$I_{5B} = \frac{V_5}{Z_2} \quad (12)$$

Here, the flow-in current $I_5$ is expressed by the following equation.

$$I_5 = I_{5A} + I_{5B} \quad (13)$$

Therefore, the following equation is obtained by transforming the equation (13) with the equations (11) and (12).

$$I_5 = \frac{V_5}{\frac{1}{R_{cir} + Z_1} + \frac{1}{Z_1}} \quad (14)$$

The ratio $(V_5/I_5)$ of the applied voltage $V_5$ and the flow-in current $I_5$ based on the equation 14 is expressed by the following equation.

$$\frac{V_5}{I_5} = \frac{1}{R_{cir} + Z_1} + \frac{1}{Z_2} \quad (15)$$

Further, the following equation is obtained by separating the equation 15 into the real part Real and the imaginary part Imge.

$$\frac{V_5}{I_5} = \text{Real} + \text{Img} \quad (16)$$

This equation (16) represents the reactance when the load resistance $R_{cir}$ is considered through the load resistance converter 17, and the optimum value $R_{pow}$ from which the maximum reception power can be obtained is expressed by the real part Real, therefore, the following equations need to be formed.

$$R_{pow} = \text{Real} \quad (17)$$

$$Img = 0 \quad (18)$$

Obtaining the reactance $Z_1$ and $Z_2$ in the equation (15) so that the equation (16) fulfills such a relationship causes what the load resistance $R_{cir}$ is converted into the optimum value $R_{pow}$ from which the maximum reception power can be obtainable by the load resistance converter 17.

That is, in the IC card 11, the load resistance converter 17 using inductance and capacitance is to supply the maximum reception power to the electronic circuit 18 (the load resistance $R_{cir}$) by setting the reactance $Z_1$ and $Z_2$ when the real part Real of equation (16) takes the optimum value $R_{pow}$ of the load resistance.

Figure 12A:
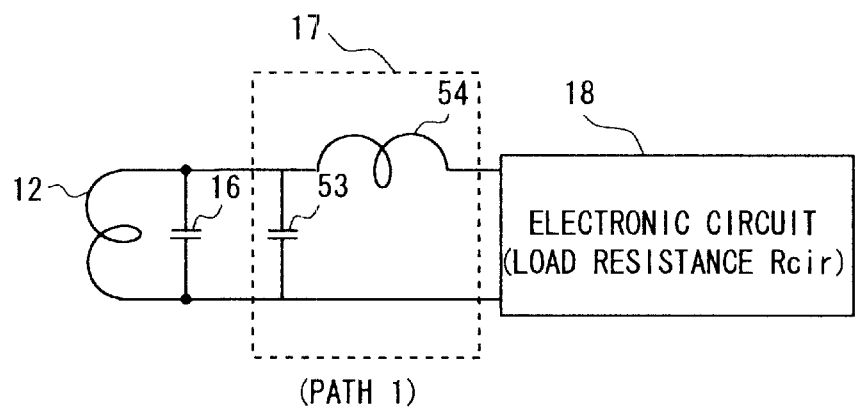
FIGS. 12A and 12B are connection diagrams exemplifying a connection between the load resistance converter using inductance and capacitance, and the electronic circuit.

For example, in the load resistance converter 17 comprising inductance and capacitance as shown in FIG. 12A, the capacitance 53 of reactance $Z_2$ is connected with the electronic circuit 18 in parallel and the inductance 54 of reactance $Z_1$ is connected with the electronic circuit 18 in series (this connection mode is referred to as path 1), so that the maximum reception power can be supplied to the electronic circuit 18.

Figure 12B:
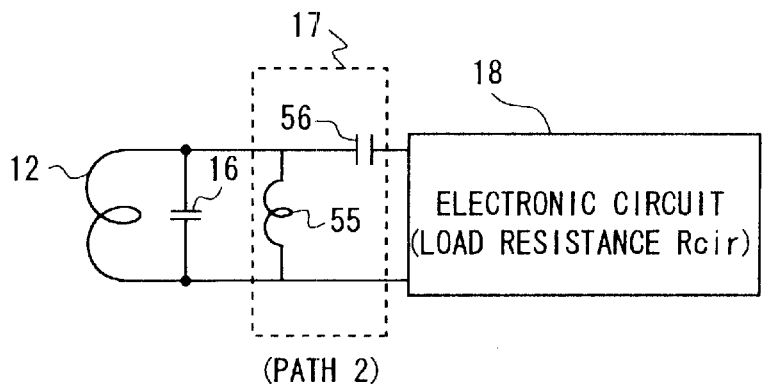

Further, in the load resistance converter 17 using inductance and capacitance as shown in FIG. 12B, the inductance 55 of reactance $Z_2$ is connected with the electronic circuit 18 in parallel and the capacitance 56 of reactance $Z_1$ is connected with the electronic circuit 18 in series (this connection mode is referred to as path 2), so that the maximum reception power can be supplied to the electronic circuit 18.

In this way, in the IC card 11, the load resistance converter 17 comprising inductance and capacitance each having a predetermined reactance value $Z_1$ and $Z_2$ is provided at the prestage of the electronic circuit 18, so that the maximum reception power can be efficiently supplied to the electronic circuit 18. Thus, the IC card 11 can realize a stable data communication with the data reader/writer 21 from a long distance.

In the foregoing configurations, the IC card 11 receives electromagnetic waves emitted from the data reader/writer 21 with the resonant circuit composed of the loop antenna 12 and the resonant capacitor 16 in a state where reception efficiency has been further improved, and with the load resistance converter 17, converts the load resistance $R_{cir}$ of the electronic circuit 18 from the viewpoint of the loop antenna 12 into the optimum value $R_{pow}$ from which the maximum reception power can be obtained in accordance with distance to the data reader/writer 21.

And the IC card 11, converting the load resistance $R_{cir}$ of the electronic circuit 18 into the optimum value $R_{pow}$ from which the maximum reception power can be obtained, supplies the maximum reception power from the both ends of the resonant capacitor 16 to the electronic circuit 18 via the load resistance converter 17.

According to the foregoing configurations, the load resistance converter 17 is disposed at the prestage of the electronic circuit 18 in the IC card 11, so that even if the load resistance $R_{cir}$ of the electronic circuit 18 is any value, the load resistance converter 17 can convert the load resistance $R_{cir}$ into the optimum value $R_{pow}$ in accordance with distance to the data reader/writer 21 to always supply the electronic circuit 18 with the maximum reception power.

Therefore, the IC card 11 can perform a stable data communication with the data reader/writer 21 from a long distance and can suppress increase in useless consumed power because it will no longer become necessary for the data reader/writer 21 to be supplied with unnecessary strong electromagnetic waves.

Incidentally, in the above-described embodiment, the primary coil, the secondary coil, and the loop coil are mounted on the substrate 15 so as to form the load resistance converter 17 using a transformer and an intermediate tap. However, the present invention is not limited thereto and the load resistance converter 17 using a transformer and an intermediate tap can be formed in a film pattern. Also in this case an effect similar to that of the above-described embodiment can be obtained.

Figure 13:
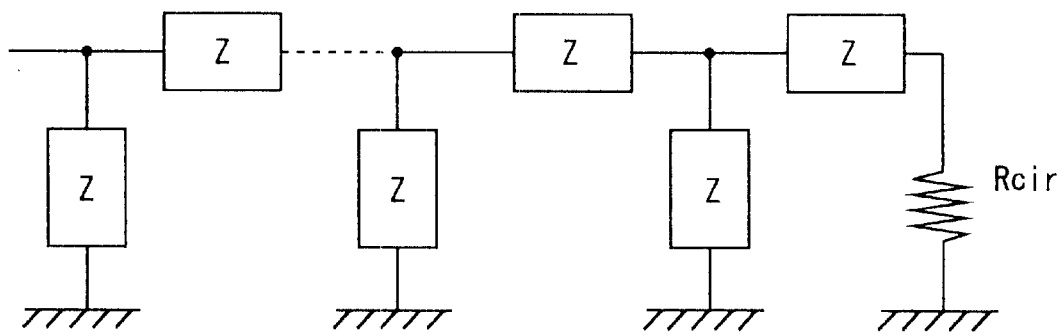
FIG. 13 is a connection diagram showing an configuration of the load resistance converter using inductance and capacitance according to another embodiment.

In addition, in the above-described embodiment, the load resistance converter 17 using inductance and capacitance is composed of a single unit of inductance and capacitance. However, the present invention is not limited thereto and as long as reactance $Z_1$ and $Z_2$ are set so that a plurality of inductance and capacitance as shown in FIG. 13 makes the real part Real of the equation (16) be the optimum value $R_{pow}$ (see FIG. 3) of the load resistance, a plurality of reactance elements can be used.

Figure 14:
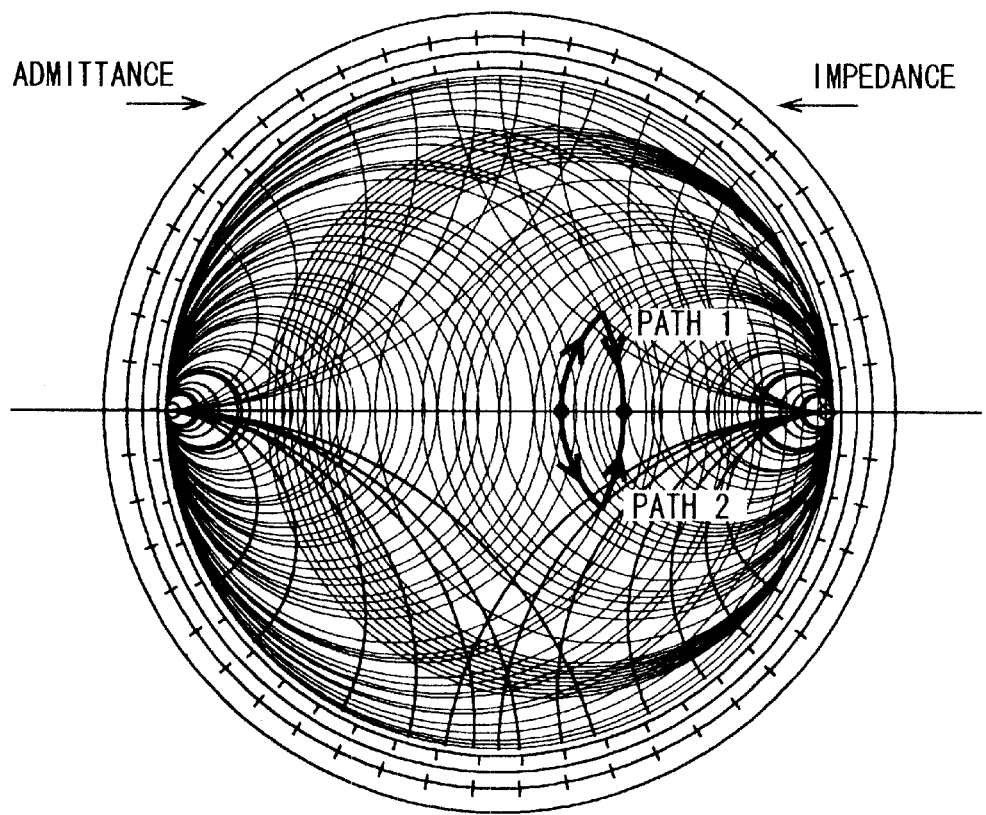
FIG. 14 is a schematic diagram showing an immitance chart for calculating reactance of the load resistance converter using inductance and capacitance according to another embodiment.

Moreover, in the above-described embodiment, the reactance $Z_1$ and $Z_2$ of the load resistance converter 17 using inductance and capacitance are obtained by the equation (11) through (18). However, the present invention is not limited thereto and the reactance $Z_1$ and $Z_2$ can be easily obtained using the chart of immitance (general term for impedance and admittance) as shown in FIG. 14.

In case of this technique using an immittance chart, impedance and admittance are converted into the concept of reflected coefficient and are graphically treated in the region. Specifically, the load resistance $R_{cir}$ of the electronic circuit 18 and the optimum value $R_{pow}$ from which the maximum reception power can be obtained are plotted and, by obtaining a path moving along the curve on the graph between the plotted points, reactance $Z_1$ and $Z_2$ of the matching circuit comprising inductance and capacitance can be easily obtained. In this case, a path corresponding to FIG. 12A is the path 1 and a path corresponding to FIG. 12B is the path 2.

Moreover, in the above-described embodiment, the optimum value $R_{pow}$ of the load resistance is set in advance in the load resistance converter 17 in accordance with the load resistance $R_{cir}$ of the electronic circuit. However, the present invention is not limited thereto and when the electronic circuit is changed, the winding number of the load resistance converter 17, the position of the intermediate tap, and the reactance $Z_1$ and $Z_2$ can be newly set so as to obtain the maximum reception power in accordance with the load resistance of the electronic circuit after the change and thereby, the optimum value $R_{pow}$ of the load resistance can be adjusted.

As described above, according to the present invention, an antenna device for supplying a predetermined electronic circuit with electromotive force based on the energy of electromagnetic waves received via the antenna, comprises a load resistance conversion means for converting the load resistance of the electronic circuit from the viewpoint of the antenna into a predetermined value, and supplies the electronic circuit with the maximum electromotive force with the load resistance conversion means. Thus, an antenna device can be realized, which can operate the connected electronic circuit always operate efficiently and normally.

A card-shaped storage medium for writing/reading data to/from a predetermined electronic circuit via electromagnetic waves in non-contact, comprises an antenna for receiving electromagnetic waves and supplying a predetermined electronic circuit with electromotive force based on the energy of the electromagnetic waves and a load resistance conversion means for converting the load resistance of the electronic circuit from the viewpoint of the antenna into a predetermined value, and supplies the electronic circuit with the maximum electromotive force. Thus, a card-shaped storage medium can be realized, which can operate the connected electronic circuit always efficiently and normally.

While there has been described in connection with the preferred embodiments of the invention, it will be obvious to those skilled in the art that various changes and modifications may be aimed, therefore, to cover in the appended claims all such changes and modifications as fall within the true sprit and scope of the invention.

What is claimed is:

1. A card storage medium for writing/reading data to/from a predetermined electronic circuit via electromagnetic waves in non-contact, comprising:

an antenna for receiving said electromagnetic waves and supplying a predetermined electronic circuit with electromotive force based on energy of the electromagnetic waves; and load resistance conversion means for converting the load resistance of said electronic circuit from the viewpoint of said antenna into a predetermined value, wherein the predetermined value is selected such that said load resistance conversion means supplies said electronic circuit with electromotive force of a magnitude adapted to deliver maximum reception power to the electronic circuit.

2. The card-shaped storage medium according to claim 1, further comprising a resonant means to improve reception efficiency by resonating with electromagnetic waves.

3. The card-shaped storage medium according to claim 1, wherein said load resistance conversion means converts the load resistance of said electronic circuit into a predetermined value in accordance with the distance to an electromagnetic waves emitting means disposed at a position opposite said antenna.

4. The card-shaped medium according to claim 1, wherein said load resistance conversion means comprises a transformer.

5. The card-shaped storage medium according to claim 1, wherein said load resistance conversion means comprises a loop coil.

6. The card-shaped storage medium according to claim 1, wherein said load resistance conversion means comprises inductance and capacitance.

7. A data processing device for writing/reading data to/from a predetermined electronic circuit via electromagnetic waves in non-contact comprising:

an antenna for receiving an electromagnetic wave modulated on the basis of data to be transmitted;

an electronic circuit for being supplied with an electromotive force based on the energy of the electromagnetic wave received via the antenna; and a load resistance converter arranged between the antenna and the electronic circuit to convert the load resistance of the electronic circuit from the viewpoint of the antenna into a value so that the maximum reception power is provided to the electronic circuit.

8. A data processing device as claimed in claim 7, further comprising a capacitor connected to the antenna in parallel to configure a resonant circuit.

9. A data processing device as claimed in claim 7, wherein said device is an IC card.

10. A data processing device as claimed in claim 7, wherein said device is an IC tag.

11. A non-contact IC card system comprising:

an IC card comprising an antenna for receiving an electromagnetic wave modulated on the basis of data to be transmitted, an electronic circuit for being supplied with an electromotive force based on the energy of the electromagnetic wave received via the antenna, and a load resistance converter arranged between the antenna and the electronic circuit, the resistance converter adapted to convert the load resistance of the electronic circuit from the viewpoint of the antenna into a value so that the maximum reception power is provided to the electronic circuit; and a reader/writer for transmitting the electromagnetic wave to the IC card.

12. The non-contact IC card system as claimed claim 11, wherein said load resistance converter converts the load resistance of the electronic circuit into a value in accordance with the distance to the reader/writer.

13. The non-contract IC card system as claimed in claim 11, wherein said IC card is tag-type.

14. The non-contact IC card system as claimed in claim 11, further comprising a capacitor connected to the antenna in parallel to configure a resonant circuit.

* * * * *